US009838979B2

United States Patent
Dorogusker et al.

(10) Patent No.: US 9,838,979 B2
(45) Date of Patent: Dec. 5, 2017

(54) POWER EFFICIENT WIRELESS NETWORK DETECTION

(75) Inventors: Jesse Lee Dorogusker, Los Altos, CA (US); Anthony Fadell, Portola Valley, CA (US); Robert Edward Borchers, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 1335 days.

(21) Appl. No.: 11/805,492

(22) Filed: May 22, 2007

(65) Prior Publication Data
US 2007/0270119 A1 Nov. 22, 2007

Related U.S. Application Data

(60) Provisional application No. 60/802,889, filed on May 22, 2006.

(51) Int. Cl.
*G06F 13/00* (2006.01)
*H04W 52/32* (2009.01)
*G06F 13/38* (2006.01)
*G06F 13/364* (2006.01)

(52) U.S. Cl.
CPC .......... *H04W 52/32* (2013.01); *G06F 13/364* (2013.01); *G06F 13/385* (2013.01); *Y02B 60/1228* (2013.01); *Y02B 60/1235* (2013.01)

(58) Field of Classification Search
USPC ....... 710/11, 14, 16–19, 110, 305, 314, 315; 370/318, 350; 455/553.1, 574
See application file for complete search history.

(56) References Cited

U.S. PATENT DOCUMENTS

| | | | | |
|---|---|---|---|---|
| 5,309,153 | A | * | 5/1994 | Gaskill et al. ............... 340/7.33 |
| 5,584,048 | A | * | 12/1996 | Wieczorek .................... 340/7.33 |
| 5,678,227 | A | * | 10/1997 | Connell et al. ............. 455/343.4 |
| 6,192,230 | B1 | * | 2/2001 | van Bokhorst et al. ... 455/343.3 |
| 6,564,074 | B2 | * | 5/2003 | Romans ........................ 455/574 |
| 6,671,525 | B2 | * | 12/2003 | Allen et al. .................. 455/574 |

(Continued)

FOREIGN PATENT DOCUMENTS

| | | |
|---|---|---|
| EP | 1119137 A1 | 7/2001 |
| EP | 1207654 A2 | 5/2002 |

(Continued)

OTHER PUBLICATIONS

Beacon Frame, Wikipedia.org <http://en.wikipedia.org/wiki/Beacon_frame>, accessed on Jan. 12, 2012.*

(Continued)

*Primary Examiner* — Raymond Phan
(74) *Attorney, Agent, or Firm* — Kilpatrick Townsend & Stockton LLP

(57) ABSTRACT

A wireless network system can be provided with a one-way communication link for communicating a beacon signal between beacon circuitries of two electronic devices. According to information stored in the beacon signal, the device that receives the beacon signal can activate a primary communication circuitry to enable communication of primary communication data signals with a primary communication circuitry of the device that transmitted the beacon signal. The beacon circuitries of the two devices may require less power than the primary communication circuitries of the two devices.

72 Claims, 3 Drawing Sheets

(56) References Cited

U.S. PATENT DOCUMENTS

| | | | |
|---|---|---|---|
| 7,330,736 B2* | 2/2008 | Redi | 455/553.1 |
| 7,369,518 B2* | 5/2008 | Lee | 370/311 |
| 7,421,257 B1* | 9/2008 | Elliott | 455/127.5 |
| 7,587,207 B2* | 9/2009 | Davies et al. | 455/456.1 |
| 2001/0055988 A1* | 12/2001 | Blake et al. | 455/575 |
| 2002/0132614 A1* | 9/2002 | Vanluijt et al. | 455/414 |
| 2003/0203740 A1* | 10/2003 | Bahl et al. | 455/516 |
| 2005/0018917 A1 | 1/2005 | Brothers | |
| 2005/0059347 A1* | 3/2005 | Haartsen | 455/41.2 |
| 2005/0099985 A1* | 5/2005 | Callaway | G08C 17/00 370/338 |
| 2005/0185917 A1 | 8/2005 | Andrzej et al. | |
| 2005/0208958 A1* | 9/2005 | Bahl et al. | 455/509 |
| 2005/0221858 A1* | 10/2005 | Hoddie | 455/557 |
| 2006/0050698 A1* | 3/2006 | Aytur et al. | 370/389 |
| 2006/0094456 A1* | 5/2006 | Rittle et al. | 455/519 |
| 2006/0285528 A1* | 12/2006 | Gao et al. | 370/338 |
| 2007/0206554 A1* | 9/2007 | Laroia et al. | 370/338 |
| 2007/0211680 A1* | 9/2007 | Laroia et al. | 370/338 |
| 2008/0084836 A1* | 4/2008 | Baird et al. | 370/311 |
| 2008/0170551 A1* | 7/2008 | Zaks | 370/338 |
| 2009/0059841 A1* | 3/2009 | Laroia et al. | 370/328 |

FOREIGN PATENT DOCUMENTS

| | | |
|---|---|---|
| WO | WO 2005/083939 A1 | 9/2005 |
| WO | 2007082036 A1 | 7/2007 |
| WO | 2007100343 A1 | 9/2007 |

OTHER PUBLICATIONS

U.S. Appl. No. 11/439,521, filed May 22, 2006, Lydon et al.
Chinese Application No. 200780018455.4, Notice of Decision to Grant dated Apr. 9, 2015. 12 pages.
Chinese Application No. 200780018455.4, Office Action dated Aug. 3, 2012. 10 pages.
Chinese Application No. 200780018455.4, Office Action dated May 27, 2014. 12 pages.
Indian Application No. IN4711/KOLNP/2008, First Examiner Report dated Mar. 10, 2014. 2 pages.
International Application No. PCT/US2007/012349, International Search Report and Written Opinion dated Nov. 23, 2007. 12 pages.

* cited by examiner

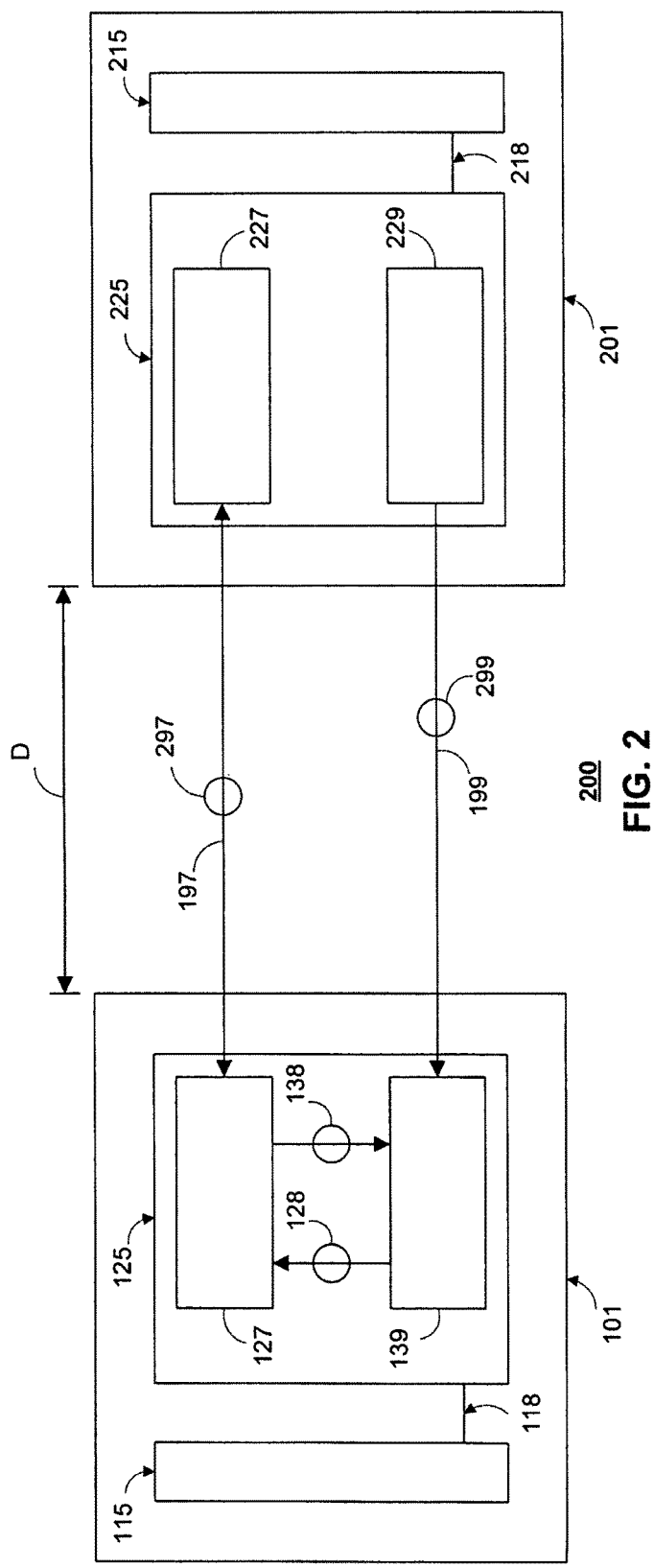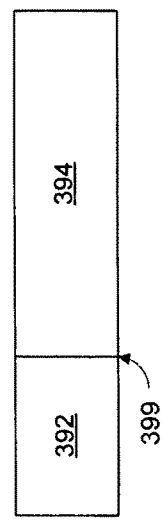

POWER EFFICIENT WIRELESS NETWORK DETECTION

CROSS-REFERENCE TO RELATED APPLICATION

This claims the benefit of U.S. Provisional Application No. 60/802,889, filed May 22, 2006, which is hereby incorporated by reference herein in its entirety.

This is also related to U.S. patent application Ser. No. 11/439,521, filed May 22, 2006, and entitled "COMMUNICATION PROTOCOL FOR USE WITH PORTABLE ELECTRONIC DEVICES", which is hereby incorporated by reference herein in its entirety.

FIELD OF THE INVENTION

This can relate to systems and methods for power efficient detection of wireless networks by electronic devices.

BACKGROUND OF THE DISCLOSURE

The present invention can relate to systems and methods for power efficient detection of wireless networks by electronic devices.

There is a need for reducing the power consumption of various electronic devices. Specifically, there is a need for reducing the power consumption of portable electronic devices that employ relatively low-capacity batteries when detecting and communicating over wireless networks.

Portable electronic devices, such as laptop computers, wireless and cellular telephones, digital media players (e.g., music players and video players), and hybrid devices that combine telephone and media playing functionalities are known. These devices are typically configured to provide communications to a user in one or more modes. For example, a laptop computer may be configured to communicate wirelessly in accordance with various protocol standards, such as cellular, Wi-Fi, and Bluetooth®. Various protocols may operate at various speeds and require various amounts of power.

One common characteristic of portable electronic devices is that, in the view of many users, they never have enough battery life. This is due to a variety of factors, including the simple fact that the devices are portable. Thus, it would be possible to extend the battery life of the devices by, for example, providing larger batteries. However, this would invariably lead to devices that are too heavy, too expensive, and too bulky. Therefore, it can be problematic if the method of detecting and communicating over wireless networks places too heavy a load on the limited amount of electrical power available to the portable devices.

In order to communicate wirelessly, some known electronic devices are equipped with receivers, transmitters, and/or transceivers for detecting a wireless network and communicating with other electronic devices in the detected network. Generally, a user must manually turn on the receiver or transceiver of the device when he or she wishes to detect a valid network for wireless communication. However, this is not convenient for the user. Alternatively, a user must constantly keep the receiver or transceiver of the device turned on when he or she wishes for the device to automatically detect a valid network for wireless communication. However, this causes the device to consume a significant amount of power (e.g., battery power of a portable electronic device).

Accordingly, what is needed are methods and systems for providing power efficient detection of wireless networks by electronic devices.

SUMMARY OF THE DISCLOSURE

Systems and methods for power efficient detection of wireless networks by electronic devices are provided.

According to a particular embodiment of the present invention, a method of operating a first device to wirelessly interoperate with a second device includes transmitting a beacon signal from the second device according to a beacon protocol and sniffing for the beacon signal with the first device according to the beacon protocol. The method also includes processing the sniffed beacon signal with the first device and, based on the processed beacon signal, enabling the first device to communicate with the second device according to a normal protocol. In one embodiment, transmitting the beacon signal may include transmitting the beacon signal via a one-way beacon-band link. Additionally, in one embodiment, the sniffing for the beacon signal may include sniffing for the beacon signal on a one-way beacon-band link.

BRIEF DESCRIPTION OF THE DRAWINGS

The above and other features of the present invention, its nature and various advantages will become more apparent upon consideration of the following detailed description, taken in conjunction with the accompanying drawings, in which like reference characters refer to like parts throughout, and in which:

FIG. 2 is an exemplary wireless network system that includes a first electronic device and a second electronic device in accordance with the principles of the present invention;

FIG. 3 is a simplified diagram of the contents of a beacon signal that may be used by the system of FIG. 2 in accordance with the principles of the present invention.

DETAILED DESCRIPTION OF THE DISCLOSURE

Methods and systems for providing power efficient detection of wireless networks by electronic devices are provided and described with reference to FIGS. 1-4.

According to an embodiment of the present invention, a method of operating a first electronic device to interoperate with a second electronic device is provided. The method may include the first device sniffing on a one-way communication link for a beacon signal transmitted from the second device, the first device processing the beacon signal, and based on the beacon signal, the first device enabling normal communication with the second device via a main-band communication link.

The one-way communication link may be utilized to communicate beacon signals transmitted from a second electronic device to a first electronic device that may have a lower or limited power supply compared to that of the second electronic device. According to information that may be contained in the beacon signal, the first electronic device may automatically, or at the discretion of its user, enable normal communication with the second electronic device via a main-band communication link. The first electronic device may require more power for normal communication than that for beacon sniffing. Circuitry required for the higher-power normal communication may be turned off when not being used for normal communication.

Figure 1:
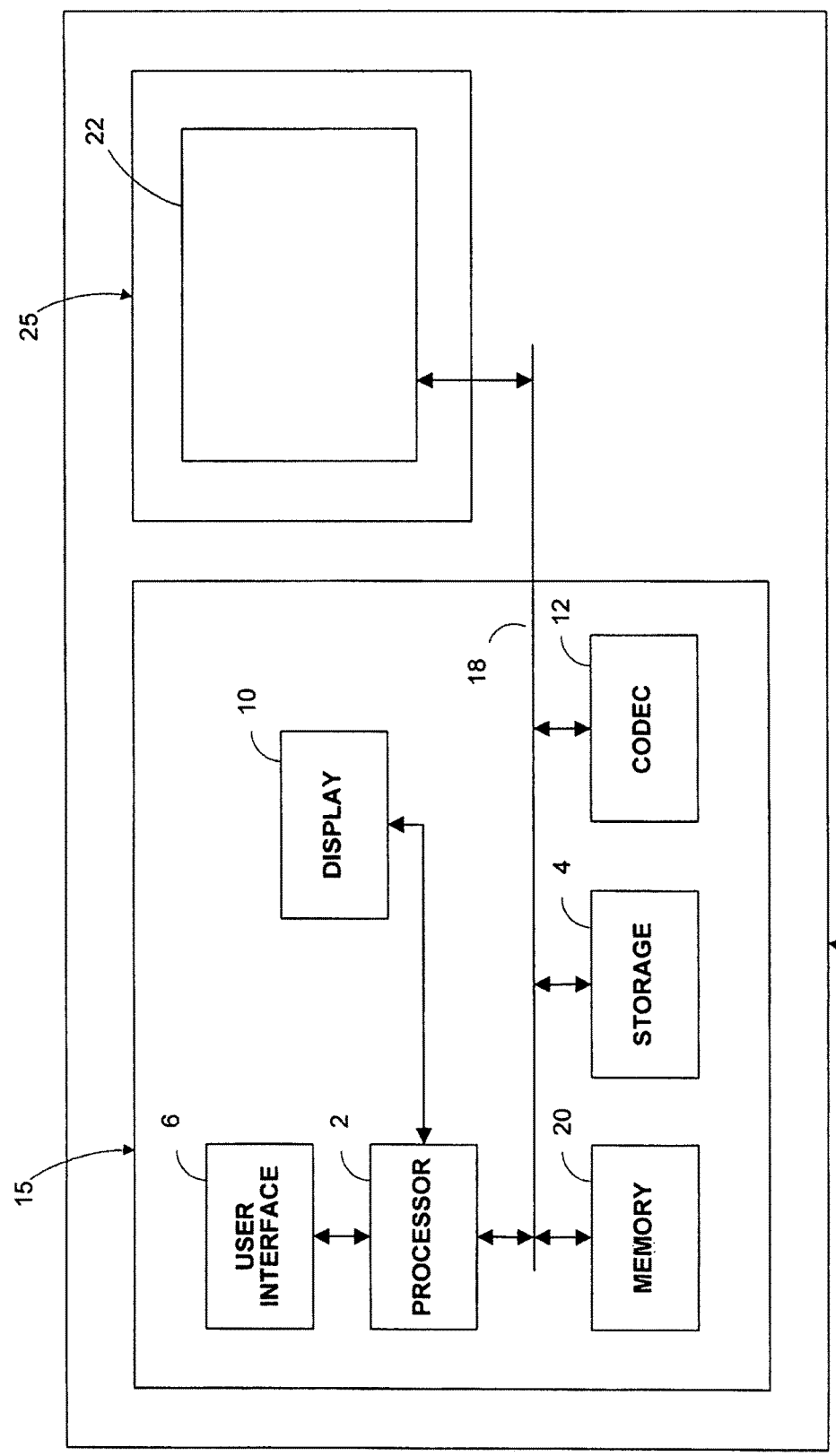
FIG. 1 is a simplified block diagram of an electronic device in accordance with the principles of the present invention.

FIG. 1 shows a simplified block diagram of an illustrative electronic device 1 that may be used in accordance with the invention. Electronic device 1 may be any electronic device, such as, but not limited to, music players, video players, still image players, game players, other media players, music recorders, video recorders, cameras, other media recorders, radios, medical equipment, calculators, cellular telephones, other wireless communication devices, personal digital assistants, remote controls, pagers, laptop computers, printers, or combinations thereof. In some cases, the electronic device may perform a single function (e.g., an electronic device dedicated to receiving and transmitting telephone calls) and, in other cases, the electronic device may perform multiple functions (e.g., an electronic device that plays music, displays video, stores pictures, and receives and transmits telephone calls). What is important for the present invention, is that electronic device 1 must be capable of communicating wirelessly in accordance with one or more wireless protocol.

In some case, electronic device 1 may generally be any portable, mobile, hand-held, or miniature electronic device capable of communicating wirelessly in accordance with one or more wireless protocol so as to allow a user to communicate wirelessly, listen to music, play games, record videos, take pictures, and/or conduct telephone calls, for example, wherever the user travels. Miniature personal electronic devices may have a form factor that is smaller than that of hand-held personal electronic devices, such as an iPod™ available by Apple Inc. of Cupertino, Calif. Illustrative miniature personal electronic devices can be integrated into various objects that include, but are not limited to, watches, rings, necklaces, belts, accessories for belts, headsets, accessories for shoes, virtual reality devices, other wearable electronics, accessories for sporting equipment, accessories for fitness equipment, key chains, or any combination thereof. Alternatively, electronic devices of the invention that are capable of communicating wirelessly in accordance with one or more wireless protocol may not be portable at all.

Electronic device 1 may include an application circuitry portion 15 and a carrier circuitry portion 25. Application circuitry portion 15 may include processor 2, storage device 4, user interface 6, display 10, coder/decoder (CODEC) 12, and memory 20. Carrier circuitry portion 25 may include communications circuitry 22. Electronic device 1 may also include bus 18 for coupling the elements of device 1.

CODEC 12 may be a single CODEC that can be stored permanently on electronic device 1, or it can include multiple CODECs. CODEC 12 may be included, for example, to convert digital audio signals into an analog signal, which may be provided to an output port (not shown) of the device. For the purposes of the present invention, CODEC 12 is intended to represent the specific encoder that is required to perform whatever function electronic device 1 is being tasked to perform. For example, if electronic device 1 is being tasked to playback music files that have been compressed and stored using the AC3 CODEC, then CODEC 12 needs to be the AC3 CODEC in order for electronic device 1 to properly decompress and playback the music file.

Processor 2 can control the operation of many functions and other circuitry included in electronic device 1. Processor 2 may drive display 10 and may receive user inputs from user interface 6. Display 10 may be any suitable display for displaying media, including graphics, text, and video. In some embodiments, display 10 may be a touch screen display or an LCD. User interface 6 may allow a user to interact with electronic device 1. For example, the device for user input 6 can take a variety of forms, such as a button, keypad, dial, click wheel, or touch screen.

Storage device 4 may store media (e.g., music and video files), software (e.g., for implementing functions on device 1), preference information (e.g., media playback preferences), lifestyle information (e.g., food preferences), exercise information (e.g., information obtained by exercise monitoring equipment), transaction information (e.g., information such as credit card information), wireless connection information (e.g., information that may enable the device to establish a wireless connection such as a telephone connection), subscription information (e.g., information that keeps tracks of podcasts, television shows, or other media a user subscribes to), telephone information (e.g., telephone numbers), and any other suitable data. Storage device 4 may include one more storage mediums, including, for example, a hard-drive, permanent memory such as ROM, semi-permanent memory such as RAM, or cache.

Memory 20 may include one or more different types of memory that may be used for performing device functions. For example, memory 20 may include cache, Flash, ROM, and/or RAM. Memory 20 may be specifically dedicated to storing firmware. For example, memory 20 may be provided for storing firmware for device applications (e.g., operating system functions, user interface functions, and processor functions).

Communications circuitry 22 may be included in carrier circuitry portion 25 of device 1. The circuitry of carrier circuitry portion 25 may be dedicated primarily to processing telephone functions or any other wireless communications capabilities of the device (e.g., Wi-Fi or Bluetooth). It is to be understood that the carrier circuitry portion may operate independently of other device components operating in device 1. That is, carrier circuitry portion 25 may be an independently operating subsystem within device 1 that may communicate with other electronic devices as well as other components within device 1.

Communications circuitry 22 may include circuitry for wireless communication (e.g., short-range and/or long range communication). For example, the wireless communication circuitry may be Wi-Fi enabling circuitry that permits wireless communication according to one of the IEEE 802.11 standards or a private network. Other wireless network protocol standards such as cellular or Bluetooth could also be used, either in alternative to the identified protocols or in addition to the identified protocols. Bus 18 may provide a data transfer path for transferring data to, from, or between the circuitry of carrier circuitry portion 25, storage device 4, memory 20, processor 2, and CODEC 12, and any other circuitry of device 1.

In one embodiment, electronic device 1 may be a portable electronic device dedicated to processing media, such as audio and video. For example, device 1 may be a media player (e.g., MP3 player), a game player, a remote controller, a portable communication device, a remote ordering interface, an audio tour player, or any other suitable personal device. In another embodiment, electronic device 1 may be a portable device dedicated to providing media processing and telephone functionality in a single integrated unit.

Device 1 may be battery-operated and highly portable so as to allow a user to listen to music, play games or video, record video or take pictures, place and take telephone calls, communicate with others, control other devices, and any combination thereof, for example. In addition, device 1 may be sized such that it fits relatively easily into a pocket or hand of the user. By being handheld, device 1 may be relatively small and easily handled and utilized by its user and thus may be taken practically anywhere the user travels. Alternatively, electronic device 1 may be a device that is generally not portable and that may be powered by wall power (i.e., domestic or line power), such as a desktop computer or an electronic device of a cellular communications tower.

Application circuitry portion 15 may include all other circuitry not specifically reserved for carrier portion 25. For example, memory 20 may provide content (e.g., instructions) to processor 2 that may enable processor 2 to execute functions of device 1. In certain circumstances, memory 20 may "engage" or "prep" processor 2 by providing it with data to perform one or more functions when device 1 switches from a beacon sniffing mode to a normal communications mode (discussed in more detail below). Memory 20 may be referred to herein as processor engagement circuitry. For example, when device 1 is operating in a beacon sniffing mode, memory 20 may store data that may be used to "engage" processor 2 so it knows, for example, a status of device 1 and operates accordingly. In some embodiments, processor 2 and memory 20 may be integrated into a single package. For example, package-on-package technology may be used to provide an integrated processor and memory package. In either case, memory 20 may also be the location in which CODEC 12 is stored.

The application circuitry portion (e.g., application portion 15) and the carrier circuitry portion (e.g., carrier portion 25) of the electronic device may each operate in accordance with the principles of the present invention. For example, carrier portion 25 may, as described in more detail below, begin wireless communications in a beacon sniffing mode by attempting to receive any beacon signals that may be detected. Other electronic devices may transmit beacon signals. Once carrier portion 25 receives a beacon signal, application portion 15 may then direct carrier portion 25 to enable and possibly begin a dialog using a normal communication protocol with the other electronic device that transmitted the received beacon signal.

FIG. 2 shows an illustration of the present invention in a wireless network system 200, which may include first electronic device 101 and second electronic device 201. It is to be understood that each of first device 101 and second device 201 may be any type of electronic device capable of wireless communication, and that each of first device 101 and second device 201 may be portable and powered by battery power or may be somewhat constrained to a particular location and powered by wall power. For example, first device 101 may be a portable electronic device, such as an iPod™ available by Apple Inc. of Cupertino, Calif., that may be powered by a battery with a limited supply of power, while second electronic device 201 may be a desktop computer, a base station, a wireless hub or router, or any other type of computing device that may typically obtain power via a power plug plugged into a wall socket or via some other high capacity power supply.

Each of devices 101 and 201 may include circuitry similar to the circuitry described with respect to device 1 of FIG. 1 that may enable each device to communicate with the other device in network 200 wirelessly using at least one protocol.

As shown, for example, first device 101 may include application circuitry portion 115 coupled to carrier circuitry portion 125 via bus 118, while second device 201 may include application circuitry portion 215 coupled to carrier circuitry portion 225 via bus 218.

According to an embodiment of the invention, while first device 101 and second device 201 may be configured to communicate with each other wirelessly using a normal higher-power communication protocol via a main-band communication link, second device 201 may also be configured to repeatedly transmit a beacon signal via the same main-band or via an out-of-band communication link and first device 101 may also be configured to periodically power up certain communications circuitry that may receive the beacon signal and therefore detect the presence of second device 201. As shown in FIG. 2, for example, carrier circuitry portion 125 of first device 101 may include primary communication circuitry 127 and carrier circuitry portion 225 of second device 201 may include primary communication circuitry 227. Primary communication circuitry 127 and primary communication circuitry 227 may be configured to wirelessly communicate primary communication data signals 297 with each other via a main-band communication link 197 using a normal communication protocol, such as cellular, Wi-Fi, or Bluetooth, for example.

One or both of primary communication circuitry 127 and primary communication circuitry 227 may be designed to transmit and/or receive primary communication data signals 297 (i.e., electromagnetic waves) for wireless communication. For example, the primary communication circuitry may include a transceiver capable of both transmitting and receiving data signals 297. Alternatively, the primary communication circuitry may include both a pure transmitter capable of transmitting data signals 297 and a pure receiver capable of receiving data signals 297. In other embodiments, the primary communication circuitry may include either a pure transmitter or a pure receiver and may therefore only be capable of either transmitting data signals 297 or receiving data signals 297. Therefore, main-band communication link 197 may either be a one-way communication link or a two-way communication link depending on the type of transmitter, receiver, and/or transceiver circuitry provided in each of primary communication circuitry 127 and primary communication circuitry 227.

Carrier circuitry portion 225 of second device 201 may also include beacon transmission circuitry 229 that may be configured to wirelessly transmit beacon signals 299 into space via a one-way beacon-band communication link 199 using a beacon communication protocol. For example, beacon transmission circuitry 229 may include a transceiver capable of both transmitting beacon signals 299 and receiving various other types of signal. Alternatively, beacon transmission circuitry 229 may include a pure transmitter that is capable of transmitting beacon signals 299 but that is not able to receive any signals. In some embodiments, beacon transmission circuitry 229 may share the transceiver or transmitter of primary communication circuitry 227 in order to reduce the amount of circuitry required on device 201. Utilization of a pure transmitter may reduce the power consumed by beacon transmission circuitry 229 while transmitting beacon signals 299 as compared to beacon transmission circuitry that utilizes a transceiver.

Additionally, carrier circuitry portion 125 of first device 101 may also include "sniffing" or beacon reception circuitry 139 that may be configured to turn on (i.e., power up) and receive any beacon signals 299 that may be available on one-way beacon-band communication link 199 using a beacon communication protocol. For example, beacon reception circuitry 139 may include a transceiver capable of both receiving beacon signals 299 and transmitting various other types of signal. Alternatively, beacon reception circuitry 139 may include a pure receiver that is capable of receiving beacon signals 299 but that is not able to transmit any signals. In some embodiments, beacon reception circuitry 139 may share the transceiver or receiver of primary communication circuitry 127 in order to reduce the amount of circuitry required on device 101. Utilization of a pure receiver may reduce the power consumed by beacon reception circuitry 139 while attempting to receive beacon signals 299 as compared to beacon reception circuitry that utilizes a transceiver.

Beacon transmission circuitry 229 may be provided in carrier circuitry portion 225 of second electronic device 201 as hardware, software, or a mix of hardware and software, for example, such that it is capable of wirelessly transmitting beacon signals 299, either on its own or by sharing a transmitter or transceiver of circuitry 227. In some embodiments, beacon transmission circuitry 229 may be configured to be constantly turned on (i.e., powered up) and may repeatedly transmit a beacon signal 299 at regular intervals into space via one-way beacon-band communication link 199 using a beacon communication protocol. Alternatively, instead of being constantly powered up, beacon transmission circuitry 229 may be configured to periodically turn on (i.e., power up) and transmit a beacon signal 299 before turning off and waiting a certain period of time before repeating the process of powering up and transmitting another beacon signal 299. This may be particularly beneficial when second electronic device 201 is a battery-powered device or when it is desired to reduce the power consumption of the device.

Similarly, beacon reception circuitry 139 may be provided in carrier circuitry portion 125 of first electronic device 101 as hardware, software, or a mix of hardware and software, for example, such that it is capable of wirelessly receiving beacon signals 299, either on its own or by sharing a receiver or transceiver of circuitry 127. In some embodiments, beacon reception circuitry 139 may be configured to be constantly powered up and may repeatedly attempt at regular intervals to receive any beacon signals 299 that may be available on one-way beacon-band communication link 199 using a beacon communication protocol. Alternatively, instead of being constantly powered up, beacon reception circuitry 139 may be configured to periodically turn on and attempt to receive a beacon signal 299 before turning off and waiting a certain period of time before repeating the process of powering up and attempting to receive a beacon signal 299. This may be particularly beneficial when first electronic device 101 is a battery-powered device or when it is desired to reduce the power consumption of the device.

The duration of each beacon signal 299, the interval between transmissions of beacon signals 299 by transmission circuitry 229, and the interval between attempts to receive beacon signals 299 by reception circuitry 139 may each be specifically related to one another within a particular beacon communication protocol. These timing quantities may be related within a particular beacon communication protocol to ensure that two devices using that protocol may successfully transmit and receive a beacon signal as soon as the two devices are positioned close enough to one another to allow for the successful exchange of a beacon signal powered according to that beacon communication protocol. For example, beacon receiving first device 101 and beacon transmitting second device 201 may each use a beacon communication protocol that guarantees the success of the first attempt to receive a transmitted beacon signal 299 once distance D is short enough to allow for the propagation of a beacon signal 299 thereacross.

FIG. 3 illustrates an example of the contents of a beacon signal sent by a second device to a first device using a beacon communication protocol in accordance with the principles of the present invention. For example, as shown, a beacon signal 399, which may be similar to beacon signal 299 of FIG. 2, may include an identification information portion 392 and a configuration information portion 394.

Identification portion 392 may include information that can be used by beacon reception circuitry (e.g., reception circuitry 139 of first device 101) to identify what specific type of electronic device transmitted the beacon signal (e.g., second device 201). For example, identification information portion 392 may indicate that the device that transmitted the beacon has a specific identification number assigned thereto and may communicate with other devices using certain types of normal communication protocols (e.g., cellular, Wi-Fi, or Bluetooth). Configuration portion 394 may include information that can be used by beacon reception circuitry to identify the specific configuration of the electronic device that transmitted the beacon signal. For example, configuration information portion 394 may indicate that the device that transmitted the beacon has recently been updated with new features or information that may be valuable to the device that received the beacon.

Once an electronic device configured to receive beacon signals successfully receives a beacon signal from an electronic device configured to transmit beacon signals, the device that received the beacon signal may activate its primary communication circuitry. For example, with reference to FIG. 2, once beacon reception circuitry 139 of first electronic device 101 successfully receives a beacon signal 299 transmitted by beacon transmission circuitry 229 of second electronic device 201 via one-way beacon-band communication link 199, first device 101 may activate its primary communication circuitry 127. When primary communication circuitry 127 is activated, wireless communication of primary communication data signals 297 between primary communication circuitry 127 and primary communication circuitry 227 of second device 201 may be enabled via main-band communication link 197 using a normal communication protocol.

Once beacon reception circuitry 139 successfully receives a beacon signal 299, beacon reception circuitry 139 may cause a main-band activation signal 128 to be provided to primary communication circuitry 127. Main-band activation signal 128 may activate primary communication circuitry 127 and enable wireless communication of primary communication data signals 297 between primary communication circuitry 127 and primary communication circuitry 227. For example, once beacon reception circuitry 139 successfully receives any beacon signal 299, beacon reception circuitry 139 may automatically cause main-band activation signal 128 to be provided to primary communication circuitry 127 for activating primary communication circuitry 127 and enabling wireless communication of primary communication data signals 297 between devices 101 and 201.

In another embodiment, once beacon reception circuitry 139 successfully receives a beacon signal 299, beacon reception circuitry 139 may compare specific information contained in the beacon signal regarding the device that transmitted the beacon signal (e.g., information portions 392 and 394 of FIG. 3) with various settings or data contained in beacon reception circuitry 139 or elsewhere in first electronic device 101. For example, the decision to provide main-band activation signal 128 for activating primary communication circuitry 127 may have a complex set of selected heuristics that maximize the power usage (e.g., the battery life) of the first device by limiting the number of situations in which primary communication circuitry 127 should be activated for enabling communication with another device using a normal communication protocol.

For example, the user of device 101 may program or load its device with data related to the specific types of other devices with which he or she would like to enable wireless communication of primary communication data signals. For instance, a user may store data in a storage device (e.g., storage 4 of FIG. 1) indicative of the user's preference to activate its electronic device's primary communication circuitry and enable wireless communication of primary communication data signals with another device only if that other device has been updated in the last 3 hours. In such a case, the user's device 101 would compare the configuration information of the beacon signal 299 received from another device (e.g., device 201) with the user's preference information and determine whether or not the other device meets the user's specifications for activating his or her electronic device's primary communication circuitry for enabling wireless communication of primary communication data signals with the other device.

In yet another embodiment, once beacon reception circuitry 139 successfully receives a beacon signal 299, first device 101 may display specific information contained in the beacon signal regarding the device that transmitted the beacon signal (e.g., information portions 392 and 394 of FIG. 3) to the user of first device 101 (e.g., via display 10 of FIG. 1). The user of first device 101 may then consider this received data regarding the detected device (e.g., second device 201) and determine whether or not to enable his or her device to engage in wireless communication of primary communication data signals with the detected device. Once the user has made that determination, he or she may input that information into device 101 (e.g., via user interface 6 of FIG. 1) such that device 101 may or may not provide main-band activation signal 128 to primary communication circuitry 127 for activating primary communication circuitry 127 and enabling wireless communication of primary communication data signals 297 between devices 101 and 201.

Up until a beacon signal has been successfully received by device 101 and device 101 has determined that it should provide main-band activation signal 128 to primary communication circuitry 127, as described above, primary communication circuitry 127 may be turned off and not consuming any power. However, once main-band activation signal 128 has been provided for activating primary communication circuitry 127, primary communication circuitry 127 of first electronic device 101 may be powered up. At that point, the potential for wireless communication of primary communication data signals 297 between primary communication circuitry 127 of first electronic device 101 and primary communication circuitry 227 of second electronic device 102 may be provided via main-band communication link 197 using a normal communication protocol, such as cellular, Wi-Fi, or Bluetooth, for example.

In some embodiments, once main-band activation signal 128 has been provided for activating primary communication circuitry 127, beacon reception circuitry 139 may be turned off to reduce the power consumed by device 101. In such a case, primary communication circuitry 127 may provide a beacon deactivation signal 138 to beacon reception circuitry 139 for deactivating beacon reception circuitry 139 until primary communication circuitry 127 has finished communication with primary communication circuitry 227. Alternatively, beacon reception circuitry 139 may continue to attempt to receive additional beacon signals while primary communication circuitry 127 is activated and communicating with another primary communication circuitry.

Once primary communication circuitry 127 of first electronic device 101 has been turned on or enabled in response to main-band activation signal 128, primary communication circuitry 127 may automatically send communication data 297 over link 197 to second device 201 for initiating communication using a normal communication protocol. In this embodiment, primary communication circuitry 227 of second device 201 may be configured to always be on or to repeatedly power up for certain intervals in order to wait and receive communication data 297 over link 197 from device 101. Alternatively, once primary communication circuitry 127 of first electronic device 101 has been turned on in response to main-band activation signal 128, primary communication circuitry 127 may automatically begin to attempt to receive communication data 297 over link 197 in accordance with a normal communication protocol. In this embodiment, primary communication circuitry 227 of second device 201 may be configured to always be on or to repeatedly power up for certain intervals in order to transmit communication data 297 over link 197 to first device 101. In some embodiments, primary communication circuitry 127 may be communicating data signals 297 at the same time as beacon reception circuitry 139 is attempting to receive beacon signals 199. Moreover, in some embodiments, primary communication circuitry 227 may be communicating data signals 297 at the same time as beacon transmission circuitry 229 is transmitting beacon signals 199.

As mentioned above, one or both of primary communication circuitry 127 and primary communication circuitry 227 may be designed to transmit and/or receive primary communication data signals 297 for wireless communication. For example, the primary communication circuitry may include a transceiver capable of both transmitting and receiving data signals 297. Alternatively, the primary communication circuitry may include both a pure transmitter capable of transmitting data signals 297 and a pure receiver capable of receiving data signals 297. In other embodiments, the primary communication circuitry may include either a pure transmitter or a pure receiver and may therefore only be capable of either transmitting data signals 297 or receiving data signals 297 from another device. In such an embodiment, main-band communication link 197 used by primary communication circuitries 127 and 227 may be a one-way main-band communication link between a pure transmitter and a pure receiver.

Beacon signals 299 may be transmitted by beacon transmission circuitry 229 and received by beacon reception circuitry 139 via one-way beacon-band communication link 199 using a beacon communication protocol that may be any communication protocol. In one embodiment, for example, the beacon communication protocol may be the same protocol as, or at least in-band with, a normal communication protocol used by primary communication circuitries 127 and 227 via main-band communication link 197 (e.g., zigbee, wibree, cellular, Wi-Fi, or Bluetooth). Alternatively, beacon signals 299 may be transmitted by beacon transmission circuitry 229 and received by beacon reception circuitry 139 using a beacon communication protocol that may be out-of-band from any normal communication protocol used by primary communication circuitries 127 and 227 via main-band communication link 197. For example, the beacon communication protocol used to communicate beacons signals 299 between beacon transmission circuitry 229 and beacon reception circuitry 139 may be at a lower bandwidth and/or may require less power (e.g., zigbee or wibree) than that of a normal communication protocol (e.g., cellular, Wi-Fi, or Bluetooth) used to communicate data signals 297 between primary communication circuitry 127 and primary communication circuitry 227. This may allow for device 101 and/or device 201 to consume even less power when transmitting and attempting to receive beacon signals for detecting a valid wireless network.

Figure 4:
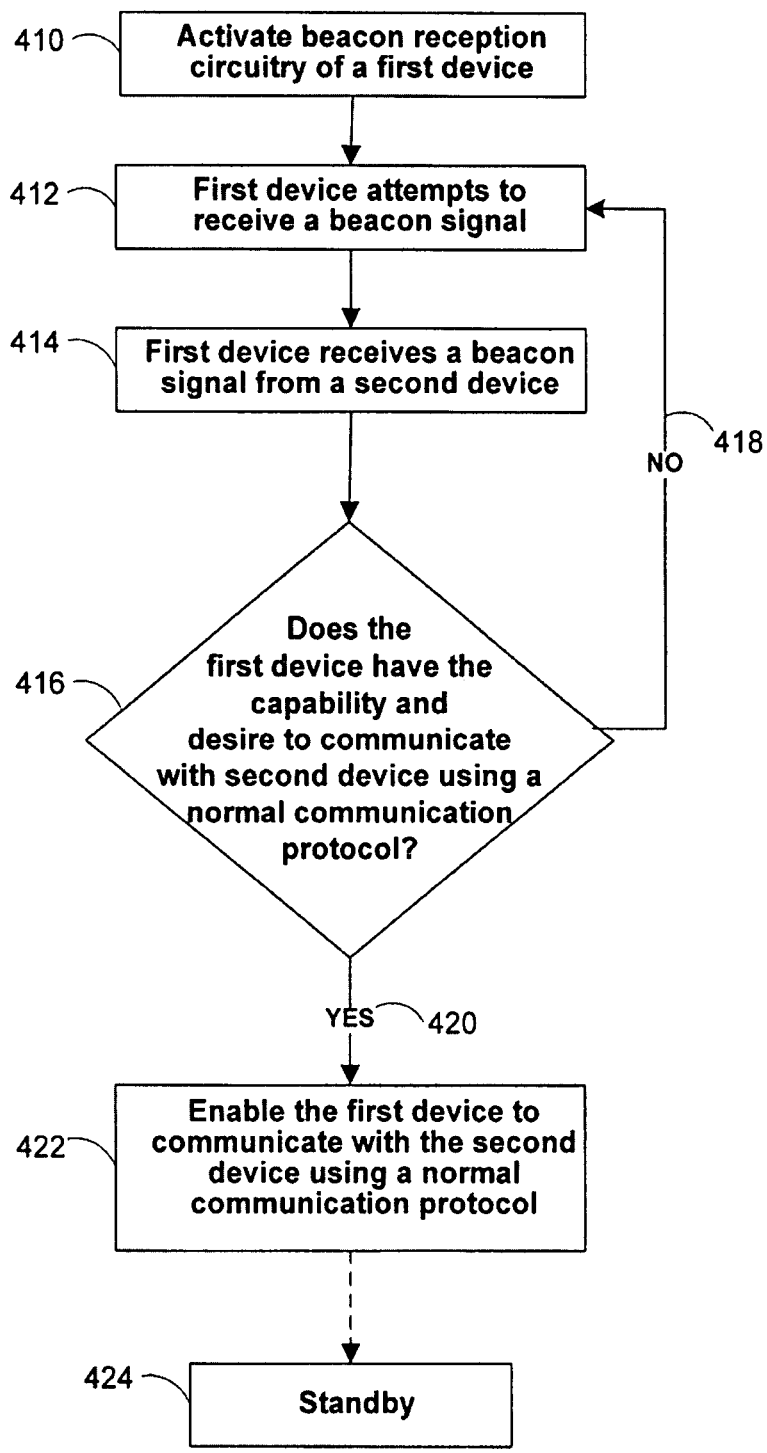
FIG. 4 is an illustrative flowchart showing various steps of a power efficient wireless communication scheme in accordance with the principles of the present invention.

FIG. 4 is an illustrative flowchart showing various steps of a power efficient wireless communication scheme according to the invention. At step 410, a user of a first device may select an option that activates beacon reception circuitry. This selection by the user may cause, at step 412, the beacon reception circuitry of the first device to attempt to receive a beacon signal on a one-way beacon-band communication link using a beacon communication protocol.

Eventually, the beacon reception circuitry of the first device receives a beacon signal transmitted from a second device using the beacon communication protocol at step 414. Once the beacon signal is received, a determination may be made by the first device at step 416 as to whether the first device has the capability or the desire to communicate with the detected second device using a normal communication protocol. If the first device does not have the capability or the desire to communicate with the detected second device using a normal communication protocol, the first device may return to attempting to receive beacon signals at step 412 via path 418. On the other hand, if the first device decides that it is capable and desirous of communicating with the detected second device using a normal communication protocol, control may pass via path 420 to step 422. In step 422, the first device may be enabled to communicate with the second device on a main-band communication link using a normal communication protocol.

It is also possible, to further increase the power efficiency of the system, to perform an additional optional step 424 (denoted by a dashed line as being optional), in which the first device powers the beacon reception circuitry down to a STANDBY mode in which a minimum or zero amount of power may be consumed by the beacon reception circuitry once the first device is enabled to communicate with the second device using a normal communication protocol. Persons skilled in the art will appreciate that either the first device or the second device could initiate communication with the other device using the normal communication protocol once the first device is enabled at step 422 without departing from the spirit and scope of the present invention.

It is understood that the steps shown in FIG. 4 are merely illustrative and that existing steps may be modified, added, or omitted. For example, persons skilled in the art will appreciate that each of the beacon communication protocol and normal communication protocol may be any communication protocol. For example, in one embodiment, a beacon communication protocol may be a low power, low speed Bluetooth protocol, and a normal communication protocol may be a high speed, high power Wi-Fi protocol. Alternately, the beacon and/or normal communication protocol could be any form of the IEEE 802.11 specification, including 802.11b, 802.11g, or some other yet to be finalized version, such as 802.11n. The beacon communication protocol and normal communication protocol may be the same protocol in one embodiment.

While there have been described systems and methods for efficiently managing power while communicating wirelessly with electronic devices, it is to be understood that many changes may be made therein without departing from the spirit and scope of the present invention. It is also to be understood that the steps shown in the flowchart discussed above are merely illustrative and that existing steps may be modified, added, or omitted. Those skilled in the art will appreciate that the invention can be practiced by other than the described embodiments, which are presented for purposes of illustration rather than of limitation, and the invention is limited only by the claims which follow.

What is claimed is:

1. A method of operating a first device to wirelessly interoperate with a second device, the second device transmitting a beacon signal according to a beacon protocol, the method comprising:

sniffing for the beacon signal with the first device using beacon reception circuitry according to the beacon protocol, the beacon signal including an identification portion with connection information for connecting to the second device and a configuration portion with configuration information;

processing the configuration portion of the sniffed beacon signal with the first device to determine the last time the second device was updated with new information;

based on the determined last time of the processed beacon signal, enabling the first device to communicate with the second device according to a normal protocol, wherein the first device is enabled to communicate with the second device according to the normal protocol if the determined last time of the processed beacon signal is more recent than a user determined time preference; and receiving, at the first device, a first primary data signal according to the normal protocol from the second device.

2. The method of claim 1, wherein the transmitting the beacon signal includes transmitting the beacon signal via a one-way beacon-band link.

3. The method of claim 1, wherein the method further comprises:

after enabling the first device to communicate with the second device according to the normal protocol, transmitting a second primary data signal from the first device to the second device according to the normal protocol via a main-band link.

4. The method of claim 1, wherein the processing the sniffed beacon signal with the first device includes displaying to a user of the first device, information related to the determined last time.

5. The method of claim 1, wherein the method further comprises:

periodically powering up the beacon reception circuitry for sniffing for the beacon signal; and periodically powering down the beacon reception circuitry for reducing the power used by the first device.

6. The method of claim 1, wherein the beacon protocol is out-of-band with the normal protocol.

7. The method of claim 1, wherein the beacon protocol is in-band with the normal protocol.

8. The method of claim 1, wherein the beacon protocol has a lower bandwidth than the normal protocol.

9. The method of claim 1, wherein the beacon protocol requires less power than the normal protocol.

10. The method of claim 1, wherein the beacon protocol is the same protocol as the normal protocol.

11. The method of claim 1, wherein the enabling the first device to communicate with the second device according to the normal protocol comprises powering up communication circuitry of the first device, and wherein the first device requires the communication circuitry to communicate with the second device according to the normal protocol.

12. The method of claim 1, wherein the determined last time enables the first device to determine a specific configuration of the second device.

13. The method of claim 1, further comprising:
determining whether or not to enable the first device to communicate with the second device according to the normal protocol by determining whether the determined last time of the processed beacon signal is more recent than the user determined time preference, and
wherein the first primary data signal is received when the first device is enabled to communicate with the second device according to the normal protocol.

14. The method of claim 2, wherein the sniffing for the beacon signal includes sniffing for the beacon signal on the one-way beacon-band link.

15. The method of claim 3, wherein the main-band link is a two-way link.

16. The method of claim 3, wherein the method further comprises: receiving the second primary data signal with the second device according to the normal protocol via a main-band link.

17. The method of claim 2, wherein the first primary data signal is received over the one-way beacon-band link.

18. The method of claim 3, wherein the transmitting the second primary data signal comprises transmitting the second primary data signal using primary data transmission circuitry, and wherein the beacon reception circuitry requires less power than the primary data transmission circuitry.

19. The method of claim 3, wherein the transmitting the second primary data signal comprises transmitting the second primary data signal using primary data transmission circuitry, and wherein the enabling the first device to communicate with the second device according to the normal protocol comprises powering up the primary data transmission circuitry.

20. The method of claim 16, wherein the method further comprises:
after receiving the second primary data signal, processing the second primary data signal with the second device; and
based on the processed second primary data signal, transmitting the first primary data signal from the second device according to the normal protocol via the main-band link.

21. The method of claim 19, wherein the method further comprises:
powering down the beacon reception circuitry after enabling the first device to communicate with the second device according to a normal protocol;
after communication of data by the primary data transmission circuitry, powering down the primary data transmission circuitry; and
after powering down the primary data transmission circuitry, powering up the beacon reception circuitry.

22. The method of claim 1, wherein the transmitting the beacon signal comprises transmitting the beacon signal using beacon transmission circuitry, wherein the transmitting the first primary data signal comprises transmitting the first primary data signal using primary data transmission circuitry, and wherein the beacon transmission circuitry and the primary data transmission circuitry share a common transmitter.

23. The method of claim 1, wherein the transmitting the beacon signal comprises transmitting the beacon signal using beacon transmission circuitry, wherein the transmitting the first primary data signal comprises transmitting the first primary data signal using primary data transmission circuitry, and wherein the beacon transmission circuitry and the primary data transmission circuitry share a common transceiver.

24. The method of claim 1, wherein the method further comprises receiving the first primary data signal with the first device using primary data reception circuitry, and wherein the beacon reception circuitry and the primary data reception circuitry share a common receiver.

25. The method of claim 1, wherein the method further comprises receiving the first primary data signal with the first device using primary data reception circuitry, and wherein the beacon reception circuitry and the primary data reception circuitry share a common transceiver.

26. The method of claim 1, wherein the method further comprises receiving the first primary data signal with the first device using primary data reception circuitry, and wherein the beacon reception circuitry requires less power than the primary data reception circuitry.

27. The method of claim 1, wherein the method further comprises receiving the first primary data signal with the first device using primary data reception circuitry, and wherein the enabling the first device to communicate with the second device comprises powering up the primary data reception circuitry.

28. A wireless network system comprising:
a second device including a beacon transmission circuitry configured to transmit a beacon signal according to a beacon protocol; and
a first device including a beacon reception circuitry and a first primary data communication circuitry, wherein the beacon reception circuitry is configured to:
sniff for the beacon signal according to the beacon protocol, the beacon signal including an identification portion with connection information for connecting to the second device and a configuration portion with configuration information;
process the configuration portion of the sniffed beacon signal to determine the last time the second device was updated with new information; and,
based on the determined last time of the processed beacon signal, enable the first primary data communication circuitry to communicate with the second device according to a normal protocol, wherein the first device is enabled to communicate with the second device according to the normal protocol if the determined last time of the processed beacon signal is more recent than a user determined time preference, and
wherein the first primary data communication circuitry, when enabled, receives a first primary data signal according to the normal protocol from the second device.

29. The system of claim 28, wherein the beacon transmission circuitry is configured to transmit the beacon signal via a one-way beacon-band link.

30. The system of claim 28, wherein the first primary data communication circuitry is configured to communicate a second primary data signal by transmitting the second primary data signal from the first device according to the normal protocol via a main-band link.

31. The system of claim 28, wherein the beacon reception circuitry and the first primary data communication circuitry share a common receiver.

32. The system of claim 28, wherein the beacon reception circuitry and the first primary data communication circuitry share a common transceiver.

33. The system of claim 28, wherein the beacon reception circuitry requires less power than the first primary data communication circuitry.

34. The system of claim 28, wherein the beacon reception circuitry is configured to power up the first primary data communication circuitry to enable the first primary data communication circuitry to communicate with the second device.

35. The system of claim 28, wherein the beacon reception circuitry is configured to process the sniffed beacon signal by displaying, to a user of the first device, information related to the determined last time.

36. The system of claim 28, wherein the beacon reception circuitry is configured to be periodically powered up to sniff for the beacon signal and periodically powered down to reduce the power used by the first device.

37. The system of claim 28, wherein the beacon protocol is out-of-band with the normal protocol.

38. The system of claim 28, wherein the beacon protocol is in-band with the normal protocol.

39. The system of claim 28, wherein the beacon protocol has a lower bandwidth than the normal protocol.

40. The system of claim 28, wherein the beacon protocol requires less power than the normal protocol.

41. The system of claim 28, wherein the beacon protocol is the same protocol as the normal protocol.

42. The system of claim 28, wherein the beacon protocol is one of a Bluetooth protocol and a Wi-Fi protocol.

43. The system of claim 28, wherein the normal protocol is one of a Bluetooth protocol and a Wi-Fi protocol.

44. The system of claim 28, wherein the beacon protocol is a Bluetooth protocol and the normal protocol is a Wi-Fi protocol.

45. The system of claim 28, wherein the first device is not configured to transmit any signal according to the beacon protocol.

46. The system of claim 28, wherein the determined last time enables the first device to determine a specific configuration of the second device.

47. The system of claim 28, wherein the beacon reception circuitry is further configured to:
determine whether or not to enable the first device to communicate with the second device according to the normal protocol by determining whether the determined last time of the processed beacon signal is more recent than the user determined time preference.

48. The system of claim 29, wherein the beacon reception circuitry is configured to sniff for the beacon signal on the one-way beacon-band link.

49. The system of claim 30, wherein the main-band link is a one-way link.

50. The system of claim 30, wherein the second device further includes second primary data communication circuitry configured to receive the second primary data signal according to the normal protocol via the main-band link.

51. The system of claim 50, wherein the second primary data communication circuitry is configured to process the second primary data signal and, based on the processed second primary data signal, transmit the first primary data signal according to the normal protocol via the main-band link.

52. The system of claim 51, wherein the first primary data communication circuitry is configured to receive the first primary data signal according to the normal protocol via the main-band link.

53. The system of claim 51, wherein the beacon transmission circuitry and the second primary data communication circuitry share a common transmitter.

54. The system of claim 51, wherein the beacon transmission circuitry and the second primary data communication circuitry share a common transceiver.

55. The system of claim 52, wherein the first primary data communication circuitry is configured to process the first primary data signal and, based on the processed first primary data signal, transmit a third primary data signal according to the normal protocol via the main-band link.

56. A first device for communicating with a second device configured to transmit a beacon signal according to a beacon protocol, the first device comprising:
a beacon reception circuitry; and
a first primary data communication circuitry, wherein the beacon reception circuitry is configured to:
sniff for the beacon signal according to the beacon protocol, the beacon signal including an identification portion with connection information for connecting to the second device and a configuration portion with configuration information;
process the configuration portion of the sniffed beacon signal to determine the last time the second device was updated with new information; and
based on the determined last time of the processed beacon signal, enable the first primary data communication circuitry to communicate with the second device according to a normal protocol, wherein the first device is enabled to communicate with the second device according to the normal protocol when the determined last time of the processed beacon signal is more recent than a user determined time preference, and
wherein the first primary data communication circuitry, when enabled, receives a first primary data signal according to the normal protocol from the second device.

57. The first device of claim 56, wherein the beacon reception circuitry is configured to sniff for the beacon signal on a one-way beacon-band link over which the beacon signal is transmitted.

58. The first device of claim 57, wherein the first primary data signal is received over the one-way beacon-band link.

59. The first device of claim 56, wherein the first primary data communication circuitry is configured to communicate a second primary data signal by transmitting the second primary data signal from the first device according to the normal protocol via a main-band link.

60. The first device of claim 59, wherein the first primary data communication circuitry is configured to communicate the second primary data signal after the first device is enabled to communicate with the second device according to the normal protocol.

61. The first device of claim 59, wherein the first primary data communication circuitry is configured to process the first primary data signal and, based on the processed first primary data signal, transmit a third primary data signal according to the normal protocol.

62. The first device of claim 59, wherein the main-band link comprises a two-way link.

63. The first device of claim 56, wherein the beacon reception circuitry and the first primary data communication circuitry share a common receiver.

64. The first device of claim 56, further comprising:
beacon transmission circuitry, wherein the beacon transmission circuitry and the first primary data communication circuitry share a common transmitter.

65. The first device of claim 56, wherein the beacon reception circuitry and the first primary data communication circuitry share a common transceiver.

66. The first device of claim 56, wherein the beacon reception circuitry requires less power than the first primary data communication circuitry.

67. The first device of claim 56, wherein the beacon reception circuitry is configured to power up the first primary data communication circuitry to enable the first primary data communication circuitry to communicate with the second device.

68. The first device of claim 56, wherein the beacon reception circuitry is configured to process the sniffed beacon signal by displaying, to a user of the first device, information related to the determined last time.

69. The first device of claim 56, wherein the beacon reception circuitry is configured to be periodically powered up to sniff for the beacon signal and periodically powered down to reduce the power used by the first device.

70. The first device of claim 56, wherein the first device is not configured to transmit any signal according to the beacon protocol.

71. The first device of claim 56, wherein the determined last time enables the first device to determine a specific configuration of the second device.

72. The first device of claim 56, wherein the beacon reception circuitry is further configured to:
determine whether or not to enable the first device to communicate with the second device according to the normal protocol by determining whether the determined last time of the processed beacon signal is more recent than the user determined time preference.

* * * * *